(12) United States Patent
Lu et al.

(10) Patent No.: US 12,337,231 B2
(45) Date of Patent: Jun. 24, 2025

(54) CONTROL ASSEMBLY WITH MULTIPLE-ANGLE POSITIONING HINGE

(71) Applicant: DEXIN CORP., New Taipei (TW)

(72) Inventors: Ho Lung Lu, New Taipei (TW); Hung-Yi Fan, New Taipei (TW)

(73) Assignee: DEXIN CORP., New Taipei (TW)

( * ) Notice: Subject to any disclaimer, the term of this patent is extended or adjusted under 35 U.S.C. 154(b) by 288 days.

(21) Appl. No.: 18/122,640

(22) Filed: Mar. 16, 2023

(65) Prior Publication Data

US 2024/0033616 A1     Feb. 1, 2024

Related U.S. Application Data

(60) Provisional application No. 63/394,245, filed on Aug. 1, 2022.

(30) Foreign Application Priority Data

Jan. 17, 2023  (TW) ................................ 112102080

(51) Int. Cl.
| | | |
|---|---|---|
| *A63F 13/00* | (2014.01) | |
| *A63F 13/235* | (2014.01) | |
| *A63F 13/24* | (2014.01) | |
| *A63F 13/98* | (2014.01) | |

(52) U.S. Cl.
CPC ............ *A63F 13/24* (2014.09); *A63F 13/235* (2014.09); *A63F 13/98* (2014.09); *A63F 2300/1031* (2013.01); *A63F 2300/1043* (2013.01)

(58) Field of Classification Search
None
See application file for complete search history.

(56) References Cited

U.S. PATENT DOCUMENTS

| | | | |
|---|---|---|---|
| 11,865,437 B1* | 1/2024 | Townley | A63F 13/24 |
| 2014/0139455 A1* | 5/2014 | Argiro | G06F 1/1632 |
| | | | 345/173 |
| 2016/0351362 A1* | 12/2016 | Tsai | A63F 13/24 |
| 2018/0369692 A1* | 12/2018 | Winick | A63F 13/355 |
| 2019/0022522 A1* | 1/2019 | Croft | G06F 3/0338 |
| 2019/0094853 A1* | 3/2019 | Overall | F16M 11/041 |
| 2019/0217208 A1* | 7/2019 | Hirose | A63F 13/98 |
| 2019/0379231 A1* | 12/2019 | Gonzalez | A63F 13/98 |
| 2020/0078670 A1* | 3/2020 | Oh | H05K 7/20172 |
| 2020/0353369 A1* | 11/2020 | Esselstrom | F16B 2/22 |
| 2021/0394048 A1* | 12/2021 | Eichinger | A63F 13/98 |
| 2022/0062755 A1* | 3/2022 | Lu | A63F 13/24 |
| 2023/0182011 A1* | 6/2023 | Vroom | H04M 1/72409 |
| | | | 463/39 |
| 2023/0233929 A1* | 7/2023 | Bosch | G06F 3/011 |
| | | | 439/39 |
| 2024/0123334 A1* | 4/2024 | Townley | A63F 13/214 |
| 2024/0245998 A1* | 7/2024 | Guinchard | A63F 13/92 |

\* cited by examiner

*Primary Examiner* — Paul A D'Agostino
(74) *Attorney, Agent, or Firm* — Maschoff Brennan

(57) ABSTRACT

A control assembly for a portable electronic device includes a mount seat, two link portions, two controllers, and at least one multiple-angle positioning hinge. The mount seat is configured to support a portable electronic device. The link portions respectively connect to two opposite sides of the mount seat. The controllers are separated from each other and movably connected to the mount seat via the link portions. The multiple-angle positioning hinge is at least connected between the link portions and the controllers or the mount seat.

6 Claims, 5 Drawing Sheets

CONTROL ASSEMBLY WITH MULTIPLE-ANGLE POSITIONING HINGE

CROSS-REFERENCE TO RELATED APPLICATIONS

This application claims the priority benefits of U.S. provisional application Ser. No. 63/394,245, filed on Aug. 1, 2022 and priority under 35 U.S.C. § 119(a) on Patent Application No(s). 112102080 filed in Taiwan (R.O.C.) on Jan. 17, 2023. The entirety of each of the above-mentioned patent applications is hereby incorporated by reference.

BACKGROUND

1. Technical Field

This disclosure relates to a control assembly, especially to a control assembly with multiple-angle positioning hinge.

2. Related Art

Nowadays, with the improvements to the performance of cell phones, people may play various types of games on their cell phones. Due to the trend of using touch-sensing screens on cellphones, games are controlled with virtual buttons, which makes the game control lack a sense of touch of real buttons, and the touch method is not enough to provide feedback of the operating strength to the user, thereby reducing the gaming experience.

Accordingly, some industries roll out a design of combining a cell phone with a controller to let the players have a better sense of control and gaming experience through the controller and real buttons. However, the controllers configured for controlling a cell phone right now do not reach a satisfying balance between adjustability and use stability.

SUMMARY

Accordingly, one of the purposes of this disclosure is to provide a control assembly with multiple-angle positioning hinge which may reach a balance between adjustability and use stability.

The control assembly according to an embodiment of the present disclosure comprises a mount seat, two link portions, two controllers, and at least one multiple-angle positioning hinge. The mount seat is configured to be mounted on a portable electronic device. The link portions are movably connected to two opposite sides of the mount seat. The controllers are separated from each other and are movably connected to the mount seat through the link portions. The multiple-angle positioning hinge is connected between the link portions and the controllers or between the link portions and the mount seat.

The control assembly according to an embodiment of the present disclosure described above may have high adjustability on the controllers and the link portions relative to the mount seat and the portable electronic device on it. Meanwhile, multiple-angle positioning hinges may be connected between the link portions and the controllers or the link portions and the mount seat. Therefore, a specific angle of the components connected to the multiple-angle positioning hinge may be maintained by the multiple-angle positioning hinge while adjusting the angle of the components mentioned above to improve the control assembly to reach a balance between adjustability and use stability.

The description of the content disclosed by the present disclosure above and the description of the implementations hereinbelow are for demonstrating and explaining the spirit and principle of the present disclosure and provide a further explanation of the claim of the present disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
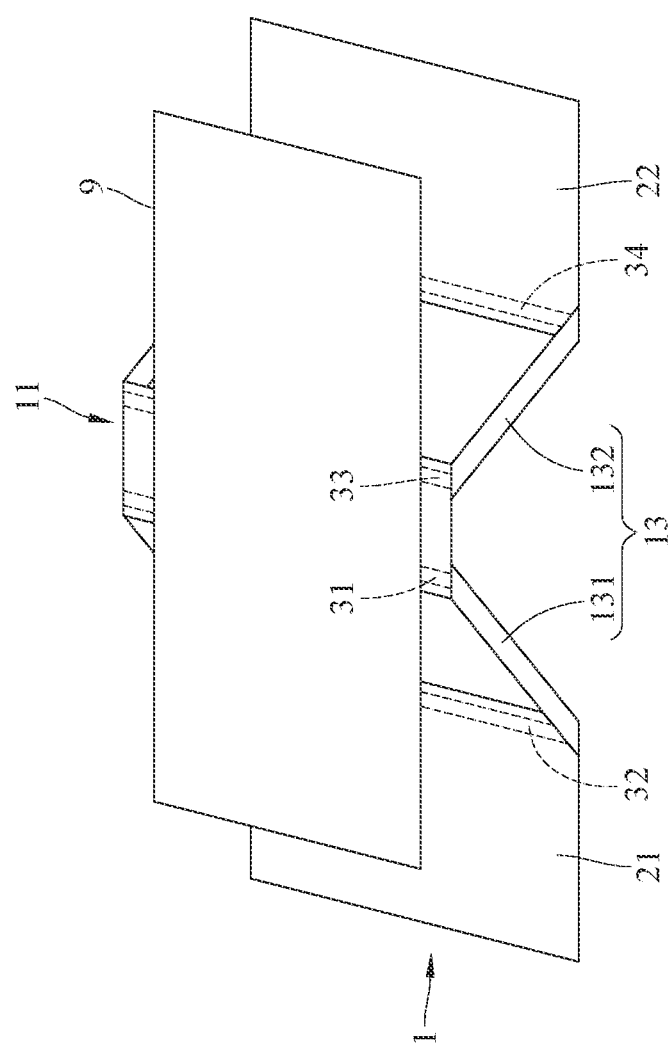
FIG. 1 is a schematic diagram illustrating a control assembly applied on an electronic device according to an embodiment of the present disclosure.

In the following detailed description, for purposes of explanation, numerous specific details are set forth in order to provide a thorough understanding of the disclosed embodiments. According to the description, claims, and drawings disclosed in the specification, one skilled in the art may easily understand the concepts and features of the present invention. The following embodiments further illustrate various aspects of the present invention but are not meant to limit the scope of the present invention.

It should be understood that, the terms and phrases used hereinbelow are only for description and should not be regarded as limiting the present disclosure. Additionally, unless stated specifically, terms such as "dispose", "configure", "connect", "assemble", and "mount" and their variants should include situations of directly or indirectly "dispose", "configure", "connect", "assemble", and "mount". Terms such as "substantially", "approximately", and "roughly" may be used below, which means the case of having a slight tolerance compared to the target value which still is in the range of manufacturing tolerance and has the same effect as the target value. Furthermore, "at least one" may be used to describe a number of the elements, but unless stated specifically, it should not be limited to the situation of the number being "only one". The term "and/or" may also be used below, it should be understood as including all the combinations of any one of the listed objects and one or more of the listed objects.

Firstly, please refer to FIG. 1, an embodiment of the present disclosure proposes a control assembly 1 which may be combined with a portable electronic device (which may be referred to as "electronic device" hereinbelow) 9. The electronic device 9 may be but is not limited to any suitable smartphone, the present disclosure is not limited thereto. The control assembly 1 may communicate with the electronic device 9 through any suitable wired or wireless method, and thereby becoming a way for the user to control the electronic device 9.

Specifically, the control assembly 1 may include a mount seat 11, a link component 13, at least one controller (for example, controller 21 and controller 22 shown in the figure), and at least one multiple-angle positioning hinge (for example, the multiple-angle positioning hinges 31, 32, 33, and 34 shown in the figure). The mount seat 11 is the part on the control assembly 1 that is configured to support and/or fix the electronic device 9. Any mechanism suitable for holding and/or stably supporting electronic devices such as smartphones may be used as the mount seat 11 of the present disclosure. The link component 13 is connected between the mount seat 11 and the controller 21 and between the mount seat 11 and the controller 22. The controllers 21 and 22 are parts of the control assembly 1 that are provided to let the left hand and the right hand of the user to handle and control the electronic device 9 respectively. It should be noted that, any suitable device that may be held in hands and may be matched with the electronic device 9 to control the electronic device 9 through signal transmission may be used as the controllers 21 and 22 of the present disclosure.

Moreover, the link component 13 may include at least one link portion (for example, the link portions 131 and 132 shown in the figure). The link portions 131 and 132 may be movably connected to two opposite sides of the mount seat 11 by the multiple-angle positioning hinge 31 and the multiple-angle positioning hinge 33, respectively. The controllers 21 and 22 may be movably connected to the link portions 131 and 132 through the multiple-angle positioning hinge 32 and the multiple-angle positioning hinge 34, respectively, so that the controllers 21 and 22 may be movably connected to the two opposite sides of the mount seat 11 through the link portions 131 and 132 and have a separated arrangement. The multiple-angle positioning hinges 31, 32, 33, and 34 may have similar configurations or the same configurations.

The description above may be a description of the basic arrangement of the control assembly 1 of the present disclosure, although FIG. 1 is only presented by simple block lines, it should be understood that, any suitable structure or mechanism design that may realize the arrangement concept mentioned above may be configured as the control assembly 1 of the present disclosure.

Figure 2:
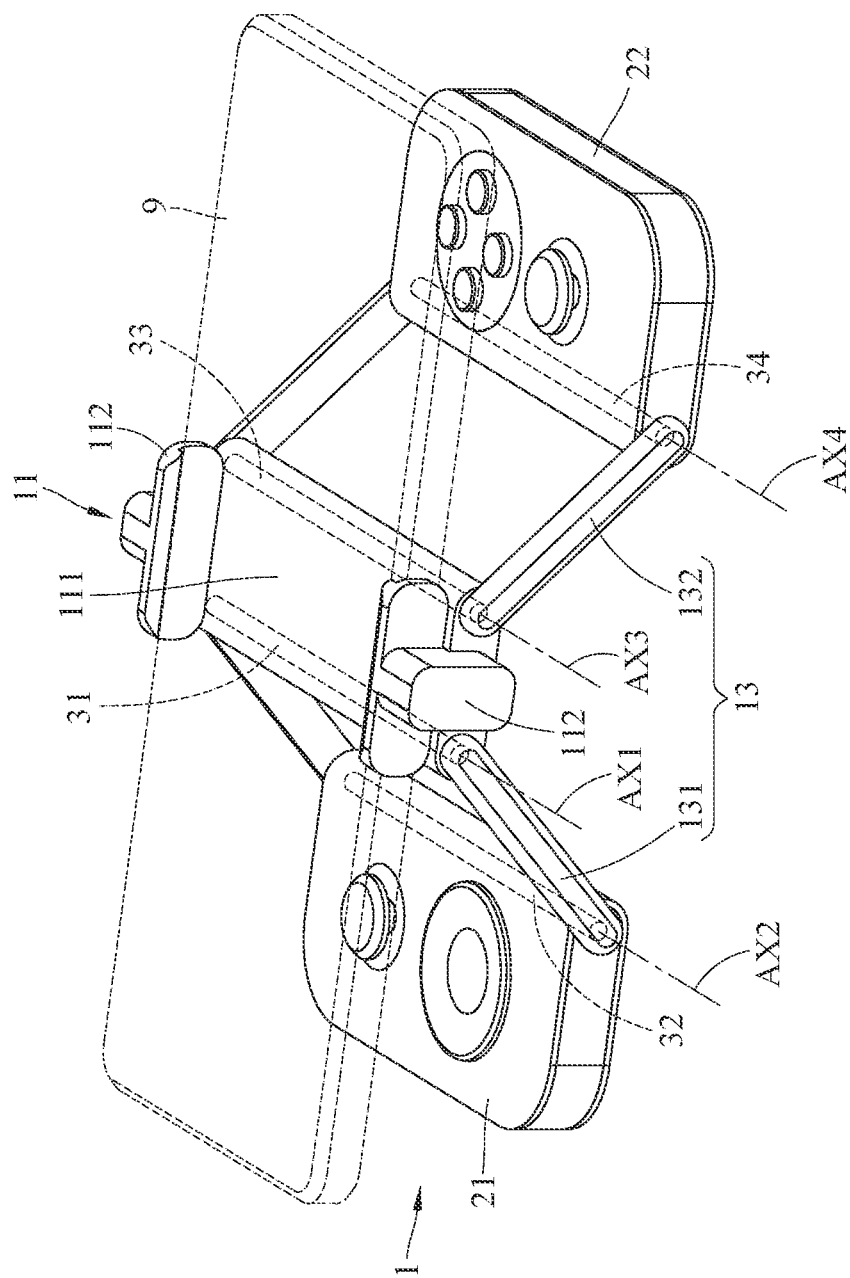
FIG. 2 is a stereo schematic diagram illustrating a control assembly applied on an electronic device according to an embodiment of the present disclosure.

For example, please refer to FIG. 2, which for example illustrates one of the exemplarily embodiments that may embody the control assembly 1 of FIG. 1. Specifically, in the present embodiment, the mount seat 11 of the control assembly 1 may include a load portion 111 and two gripping structures 112, the load portion 111 is the part on the mount seat 11 that is configured to load (support) the electronic device 9, and the gripping structures 112 may be slidably located at two opposite ends of the load portion 111 to be configured to grip the electronic device 9 when the load portion 111 is loads the electronic device 9.

Due to the design of the link portions 131 and 132 connected to the mount seat 11 with the multiple-angle positioning hinge 31 and the multiple-angle positioning hinge 33 and the design of the controllers 21 and are connected to the link portions 131 and 132 with the multiple-angle positioning hinge 32 and the multiple-angle positioning hinge 34, the controllers 21 and 22 and the link portions 131 and 132 have high adjustment flexibility relative to the mount seat 11, and an interval and a relative position between the controllers 21 and 22 and an angle and a relative position of the controllers 21 and 22 relative to the mount seat 11 may be adjusted by the user.

The multiple-angle positioning hinge mentioned herein may be, for example, any suitable torque hinge with a lock feature or an angle fixture feature (torque hinge with lock/latch), damping hinge, or constant torque position control hinge. In an application where the multiple-angle positioning hinge is a torque hinge with a lock feature or an angle fixture feature, a component that is connected thereto may be selectively fixed at 90 degrees, 135 degrees, 180 degrees, or any other required degrees; in an application where the multiple-angle positioning hinge is a damping hinge, a component that is connected thereto may be stopped selectively at angles such as 90 degrees, 135 degrees, 180 degrees, or other required angles; in an application where the multiple-angle positioning hinge is a constant torque position control hinge, a component that is connected thereto may be stopped selectively at angles such as 90 degrees, 135 degrees, 180 degrees, or other required angles.

Figure 3:
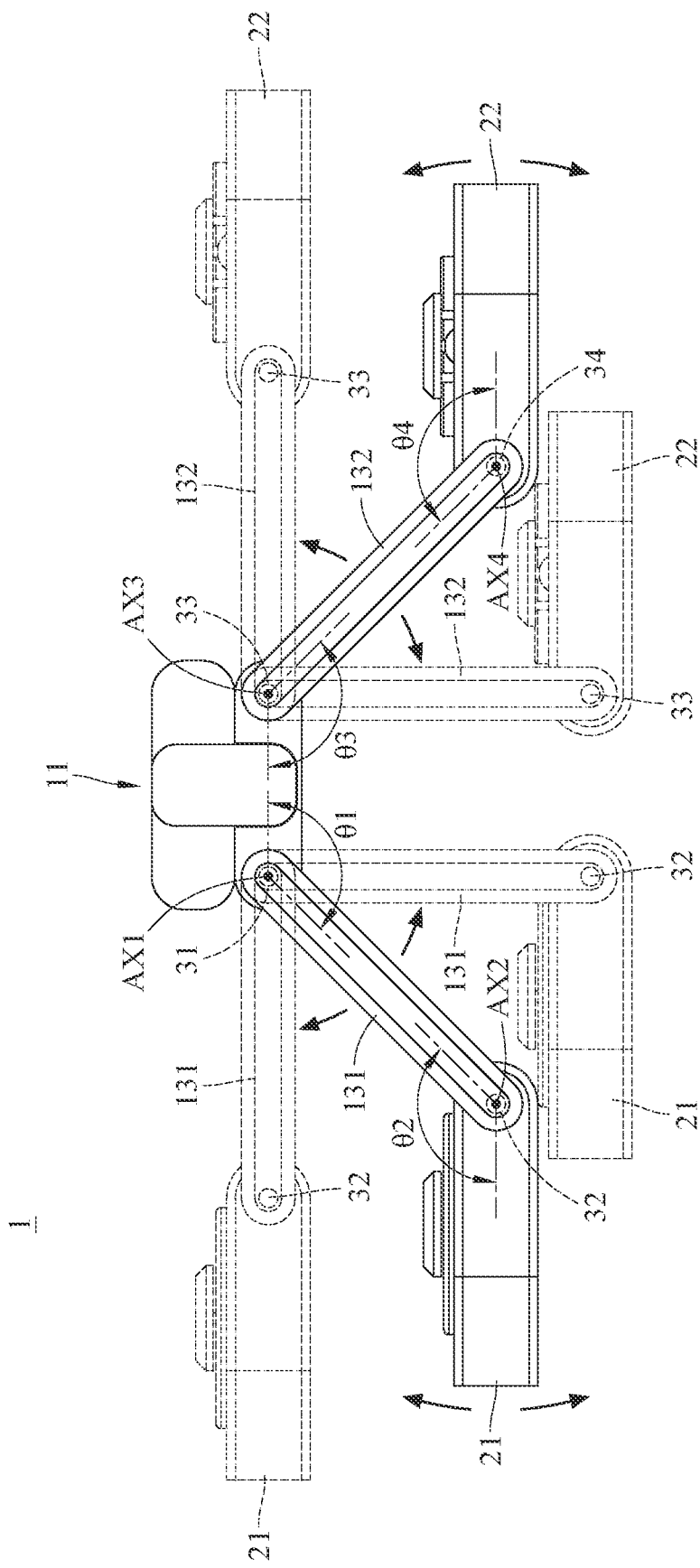
FIG. 3 is a front schematic diagram illustrating the control assembly of FIG. 2 switching between different angles.

For example, please refer to FIG. 3, the multiple-angle positioning hinge 31 may let the link portion 131 and the mount seat 11 rotate around a pivot axis AX1 (as shown by the arrow) relatively to each other and provide a resistance to let the link portion 131 maintain at multiple specific angles (for example angle $\theta 1$ may be 90 degrees, 135 degrees, 180 degrees, or any other required angles) relatively to the mount seat 11. Similarly, the multiple-angle positioning hinge 32 may let the controller 21 and the link portion 131 rotate around a pivot axis AX2 (as shown by the arrow) relatively to each other and provide a resistance to let the controller 21 maintain at specific angles (for example $\theta 2$ may be 90 degrees, 135 degrees, 180 degrees, or any other required angles) relatively to the link portion 131, the multiple-angle positioning hinge 33 may let the link portion 132 and the mount seat 11 rotate around a pivot axis AX3 (as shown by the arrow) relatively to each other and provide a resistance to let the link portion 132 maintain at specific angles (for example $\theta 3$ may be 90 degrees, 135 degrees, 180 degrees, or any other required angles) relatively to the mount seat 11, the multiple-angle positioning hinge 34 may let the controller 22 and the link portion 132 rotate around a pivot axis AX4 (as shown by the arrow) relatively to each other and provide a resistance to let the controller 22 maintain specific angles (for example $\theta 4$ may be 90 degrees, 135 degrees, 180 degrees, or any other required angles) relatively to the link portion 132.

More specifically, for example, during the process of adjusting the angle $\theta 1$ of the link portion 131 relative to the mount seat 11, the multiple-angle positioning hinge 31 allows the link portion 131 to rotate around the pivot axis AX1 relatively to the mount seat 11, an effect of stepless adjustment may be presented at this time, but when the angle $\theta 1$ approaches or is at 90 degrees, 135 degrees, 180 degrees, or any other required angles, the multiple-angle positioning hinge 31 may apply or raise the resistance to the continued rotation of the link portion 131 relative to the mount seat 11 to let the angle $\theta 1$ stops at 90 degrees, 135 degrees, 180 degrees, or any other required angles, an effect of step adjustment is presented at this time, which is helpful to provide the adjustability and stability that is needed for the user to operate the control assembly 1 at the desired angle.

Similarly, during the process of progress of adjusting the angle $\theta 2$ of the controller 21 relative to the link portion 131, the multiple-angle positioning hinge 32 allows the controller 21 to rotate around the pivot axis AX2 relatively to the link portion 131 and present an effect of stepless adjustment, but when angle $\theta 2$ approaches or is at 90 degrees, 135 degrees, 180 degrees, or any other required angles, the multiple-angle positioning hinge 32 may apply or raise the resistance to the continued rotation of link portion 131 relatively to the mount seat 11 to let the angle $\theta 2$ stops at 90 degrees, 135 degrees, 180 degrees, or any other required angles; during the process of adjusting the angle θ3 of the link portion 132 relative to the mount seat 11, the multiple-angle positioning hinge 33 allows the link portion 132 to rotate around the pivot axis AX3 relatively to the mount seat 11 and present an effect of stepless adjustment, but when angle θ3 approaches or is at 90 degrees, 135 degrees, 180 degrees, or any other required angles, the multiple-angle positioning hinge 33 may apply or raise the resistance to the continued rotation of the link portion 132 relatively to the mount seat 11 to let the angle θ3 stop at 90 degrees, 135 degrees, 180 degrees, or any other required angles; during the process of adjusting the angle θ4 of the controller 22 relative to the link portion 132, the multiple-angle positioning hinge 34 allows the controller 22 to rotate around the pivot axis AX4 relatively to the link portion 132 and present an effect of stepless adjustment, but when angle θ4 approaches or is at 90 degrees, 135 degrees, 180 degrees, or any other required angles, the multiple-angle positioning hinge 34 may apply or raise the resistance to the continued rotation of the controller 22 relatively to the link portion 132 to let the angle θ4 stop at 90 degrees, 135 degrees, 180 degrees, or any other required angles.

Figure 4:
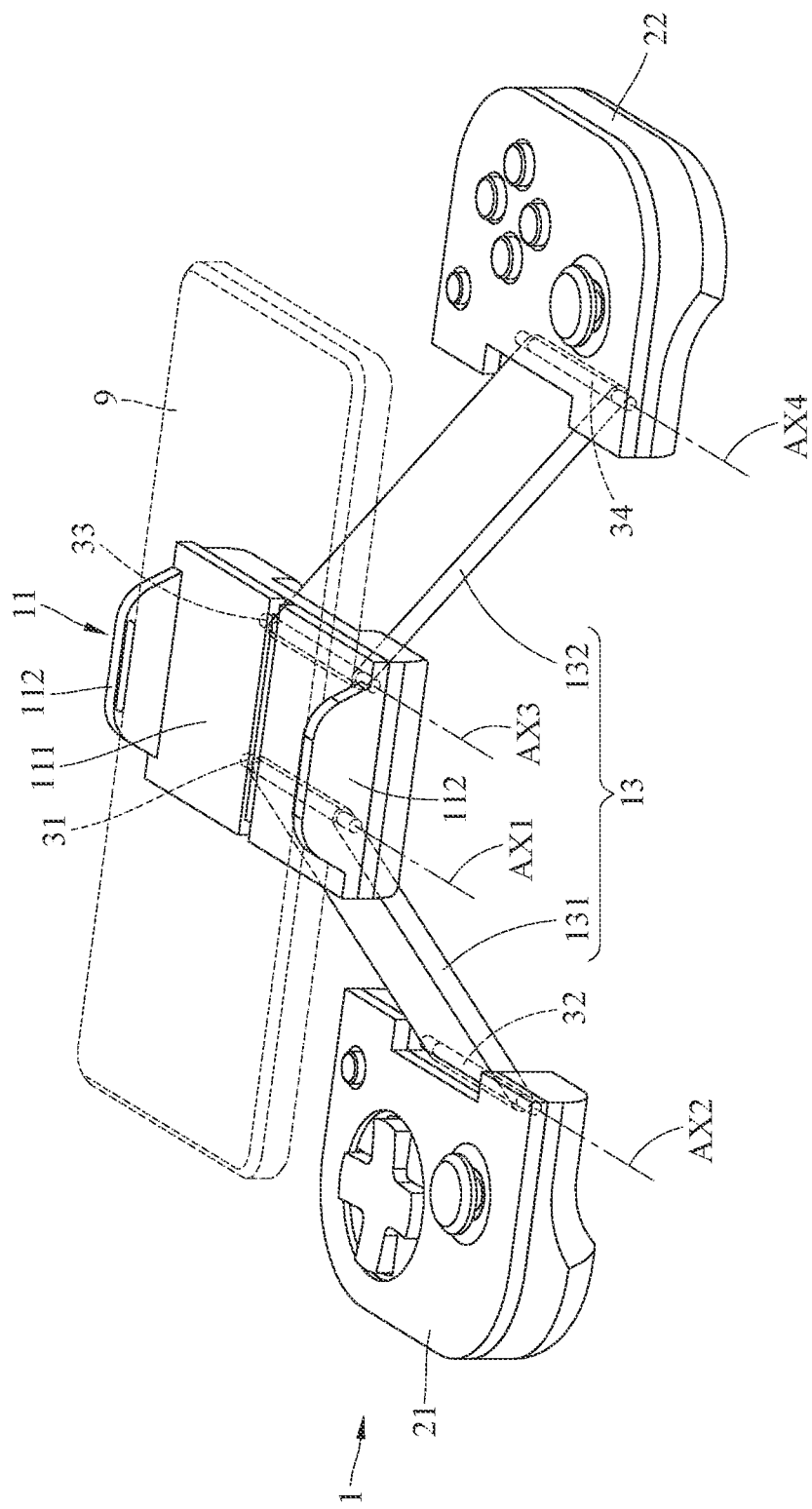
FIG. 4 is a stereo schematic diagram illustrating a control assembly applied on an electronic device according to another embodiment of the present disclosure.

It should be understood that, the embodiment mentioned above is only one example to realize the control assembly of the present disclosure. As long as the basic configuration shown in FIG. 1 may be realized, any suitable adjustment or modification may be performed on the control assembly of the present disclosure according to requirements. For example, please refer to FIG. 4, in the present embodiment, although the link portions 131 and 132 of the link component 13 and the load portion 111 and the two gripping structures 112 of the mount seat 11 of the control assembly 1 have different outlooks, but similarly, due to the design of the link portions 131 and 132 connected to the mount seat 11 through the multiple-angle positioning hinge 31 and the multiple-angle positioning hinge 32 and the design of the controllers 21 and 22 connected to the link portions 131 and 132 through the multiple-angle positioning hinge 32 and the multiple-angle positioning hinge 34, the control assembly 1 still has high adjustment flexibility.

Figure 5:
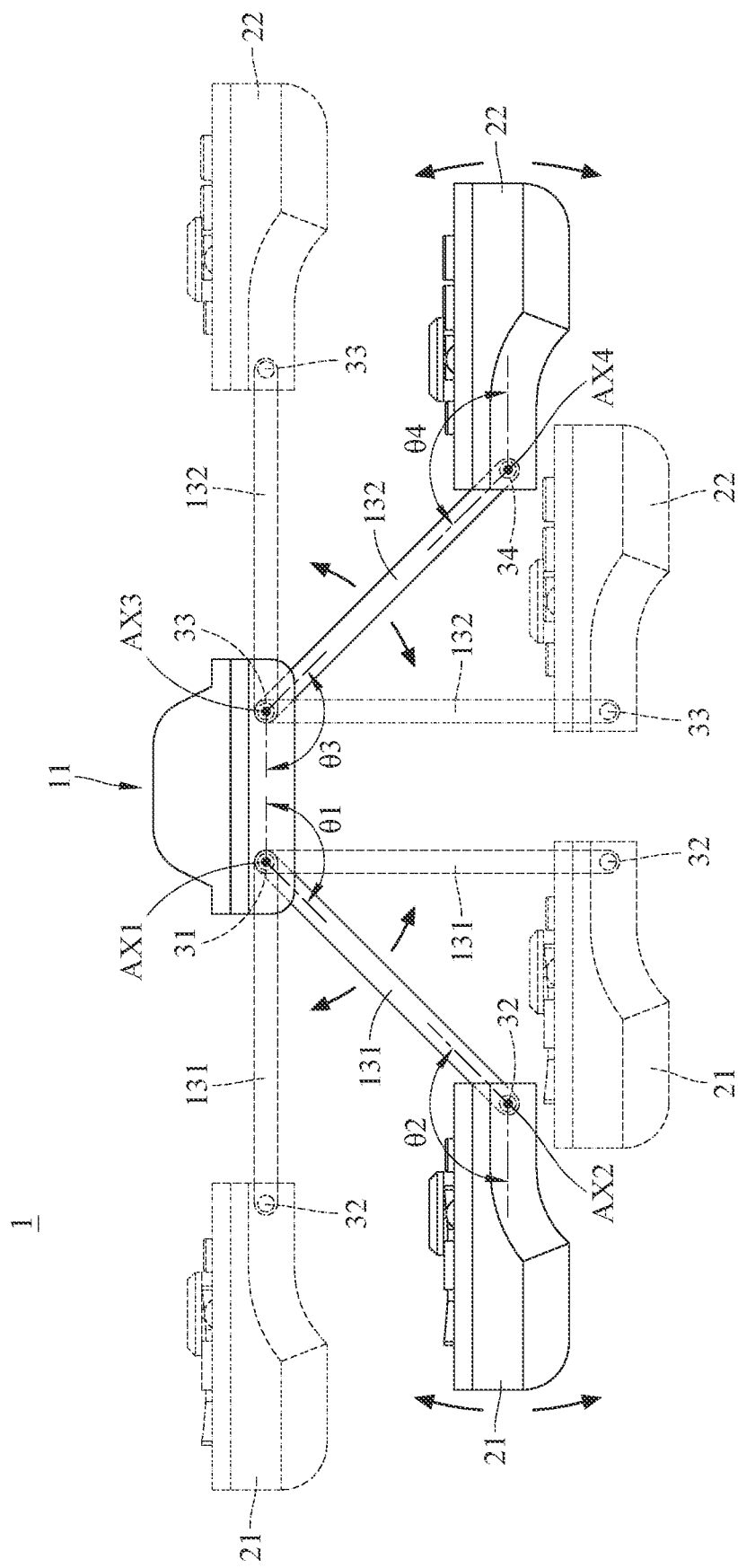
FIG. 5 is a front schematic diagram illustrating the control assembly of FIG. 4 switching between different angles.

For example, please refer to FIG. 5, the link portion 131 and the mount seat 11 may rotate around the pivot axis AX1 (as shown by the arrow) relatively to each other, and the multiple-angle positioning hinge 31 may provide resistance so that the link portion 131 maintains at particular angles (for example θ1 may be 90 degrees, 135 degrees, 180 degrees, or any other required angle) relatively to the mount seat 11 during the process. Similarly, the controller 21 and the link portion 131 may rotate around the pivot axis AX2 (as shown by the arrow) relatively to each other, and the multiple-angle positioning hinge 32 may provide resistance so that the controller 21 maintains at particular angles (for example θ2 may be 90 degrees, 135 degrees, 180 degrees, or any other required angle) relatively to the link portion 131 during the process, the link portion 132 and the mount seat 11 may rotate around the pivot axis AX3 (as shown by the arrow) relatively to each other, and the multiple-angle positioning hinge 33 may provide resistance so that the link portion 132 maintains at particular angles (for example θ3 may be 90 degrees, 135 degrees, 180 degrees, or any other required angle) relatively to the mount seat 11 during the process, and the controller 22 and the link portion 132 may rotate around the pivot axis AX4 (as shown by the arrow) relatively to each other, and the multiple-angle positioning hinge 34 may provide resistance so that the controller 22 maintains at particular angles (for example θ2 may be 90 degrees, 135 degrees, 180 degrees, or any other required angles) relatively to the link portion 132 during the process.

It should be noted that, the number of the multiple-angle positioning hinge of the control assembly may increase or decrease according to the actual requirements, the present disclosure is not limited thereto. For example, the control assembly may only set any of the types of the multiple-angel positioning hinges mentioned above between only one controller and the link portion, or only set any of the types of the multiple-angle positioning hinges between the mount seat and one of the link portions.

According to the control assembly with multiple-angle positioning hinge disclosed by the embodiments of the present disclosure described above, due to the link portions movably connected to two opposite sides of the mount seat and the controllers movably connected to the mount seat through the link portions separately, the controllers and the link portions have high adjustment flexibility relative to the mount seat and the portable electronic device above it. Meanwhile, the multiple-angel positioning hinge may be connected between the link portions and the controllers or the mount seat. Therefore, the multiple-angle positioning hinge maintain specific angles of the components connected to it when adjusting the angle of the components mentioned above to improve the control assembly to achieve balance between adjustability and use stability.

Although the present disclosure is disclosed by the embodiments above, but the embodiments are not intended to limit the present disclosure. Any changes or modifications that do not depart from the spirit and the scope of the present disclosure belongs to the protection scope of the present disclosure. Please refer to the claims of the present disclosure for the scope of protection of the present disclosure.

What is claimed is:

1. A control assembly, comprising:
   a mount seat, having a support surface configured to support a portable electronic device;
   two link portions movably connected to two opposite sides of the mount seat, respectively;
   two controllers separated from each other and movably connected to the mount seat through the two link portions; and
   at least one multiple-angle positioning hinge at least connected between the two link portions and the two controllers or between the two link portions and the mount seat;
   wherein the at least one multiple-angle positioning hinge allows the two link portions to rotate relative to the two controllers or the mount seat about pivot axes, and the pivot axes are parallel to the support surface of the mounted seat.

2. The control assembly of claim 1, wherein the at least one multiple-angle positioning hinge is a torque hinge with a locking function, a damping hinge, or a constant torque position control hinge.

3. The control assembly of claim 1, wherein the at least one multiple-angle positioning hinge comprises four multiple-angle positioning hinges, and the multiple-angle positioning hinges are connected between the two link portions and the two controllers and between the two link portions and the mount seat.

4. The control assembly of claim 1, wherein the mount seat comprises a load portion and two gripping structures, the two controllers are movably connected to the load portion, the two gripping structures are slidably located at two opposite ends of the load portion, respectively, and the two gripping structures are configured to grip the portable electronic device.

5. The control assembly of claim 1, wherein the two controllers communicate with the portable electronic device with a wired method.

6. The control assembly of claim 1, wherein the two controllers communicate with the portable electronic device with a wireless method.

* * * * *